Aug. 25, 1953  G. A. LYON  2,650,133
WHEEL STRUCTURE AND METHOD OF BALANCING SAME
Filed Oct. 2, 1947
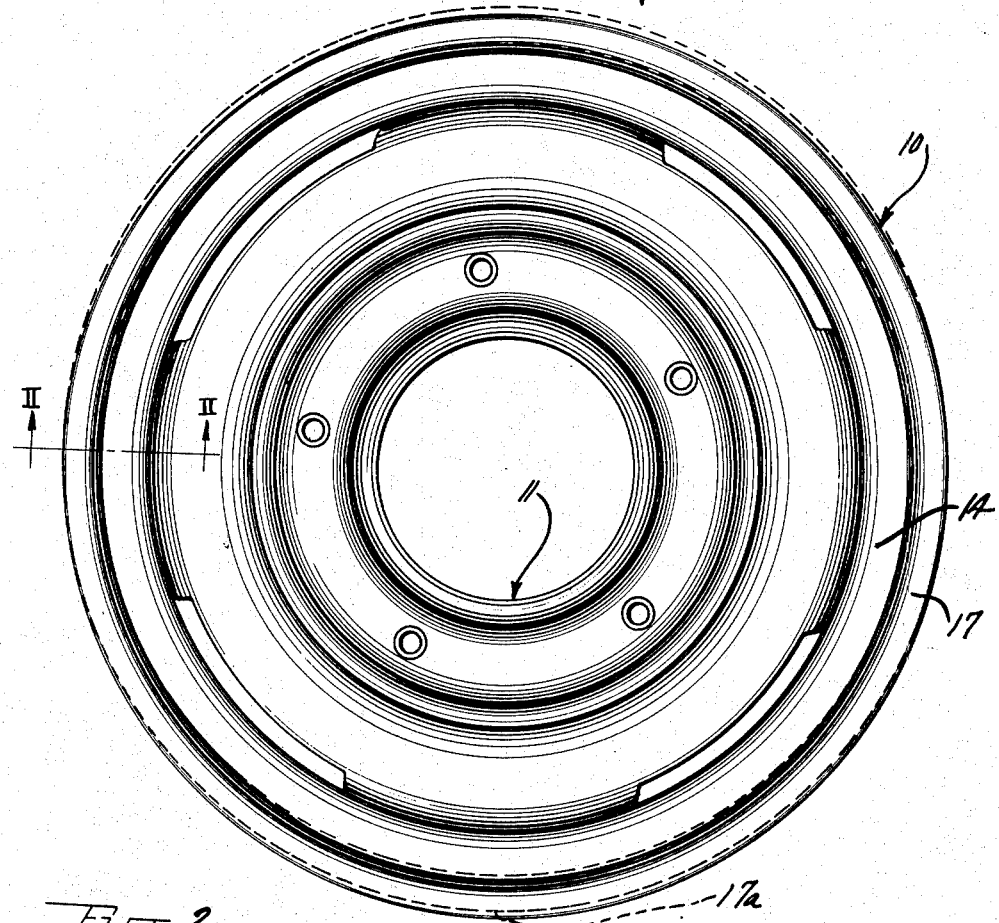
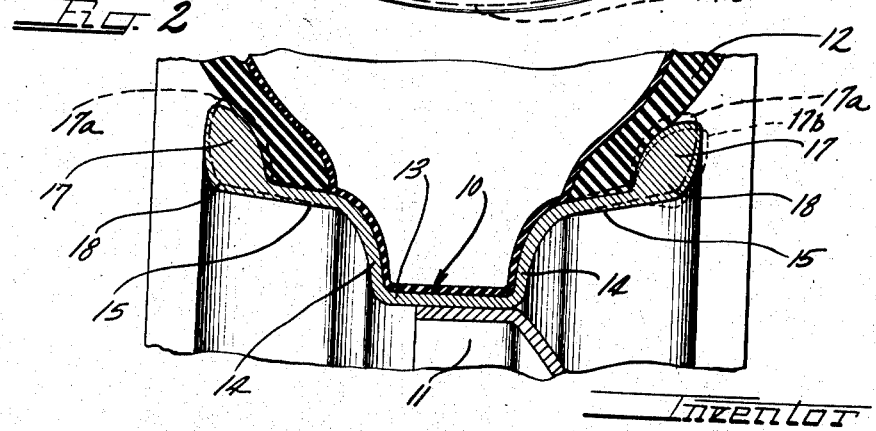
Inventor
GEORGE ALBERT LYON
by
Attys.

Patented Aug. 25, 1953

2,650,133

UNITED STATES PATENT OFFICE 2,650,133

WHEEL STRUCTURE AND METHOD OF BALANCING SAME

George Albert Lyon, Detroit, Mich.

Application October 2, 1947, Serial No. 777,379

9 Claims. (Cl. 301—5)

This invention relates to improvements in wheel structures and more particularly concerns a novel method of balancing wheel structures such as pneumatically tired vehicle wheels, and a wheel thus balanced.

Heretofore it has been customary to make vehicle wheels, and particularly wheels such as are used on automobiles, from suitable gauge sheet metal, the rim part being rolled and the body or spider portion being formed as a stamping. The material throughout was of a substantially uniform thickness and of as thin a gauge as practicable. Therefore, it will be readily apparent that the overall mass of the wheel structure was more or less uniformly, radially distributed through the wheel. With such a construction, it has been common experience that slight unbalancing distributions or maldistribution of weight at the radially outer portion or perimeter of the wheel assembly, and more particularly after the tire has been mounted in the assembly, has had serious unbalancing effect, especially in high speed operation. Common practice for overcoming such unbalances has been to apply small counterbalancing weights to the tire rim. Among the unbalancing factors to be found in such a wheel assembly may be mentioned uneven wear of the tire, the eccentrically disposed tire valve stem, physical distortions of the tire rim or other portion of the wheel structure, and the like.

An important object of the present invention is to provide an improved method of counterbalancing vehicle wheels and which method eliminates the need for separate wheel balancing weights.

Another object of the invention is to provide in a novel wheel structure a tire rim having a concentration of weight adapting the same for substantially flywheel damping of the customary unbalancing factors present in vehicle wheel assemblies and which is adjusted for any persistent major unbalances by an eccentric redisposition of the concentrated rim weight.

A further object of the invention is to provide a novel method of counterbalancing vehicle wheels wherein a tire rim is provided with a symmetrical permanent counterbalancing weight distribution, and which comprises altering the disposition of the counterbalancing weight of the tire rim relative to the axis of the wheel for attaining dynamic and gyroscopic balance.

Still another object is to counterbalance, gyroscopic or side deflections of a vehicle wheel by axial redisposition of a part of the tire rim.

In accordance with the general features of the present invention, there is provided a wheel structure having a tire rim portion in which one or both terminal flanges are of substantially increased mass over prior constructions to the extent that, in the high speed rotation of the wheel, the concentrated mass in the periphery of the tire rim acts substantially in the nature of a flywheel to damp out unbalancing factors and thus attain dynamic balance in the wheel, the concentrated mass of said flange or flanges being disposed selectively eccentrically relative to the wheel axis for counterbalancing any major unbalancing factors which the concentrated peripheral mass may be incapable of damping in a concentric relation to the wheel axis.

According to other general features of the invention, there is provided an improved method of counterbalancing vehicle wheels wherein the tire rim has a peripheral concentration of mass, which comprises uniformly shifting the entire concentrated mass portion of the rim eccentric to the wheel axis.

According to other general features of the invention, there is provided an improved method of counterbalancing vehicle wheels having tire rims, which comprises uniformly shifting the tire rim terminal flange portion transversely relative to the wheel axis.

Other objects, features and advantages of the present invention will be readily apparent from the following detailed description of a preferred embodiment thereof taken in conjunction with the accompanying drawings, in which:

Figure 1 is an elevational view of a vehicle wheel structure embodying the features of the invention; and Figure 2 is a fragmentary, enlarged radial detail sectional view taken substantially on the line II—II of Figure 1.

As shown on the drawing:

A wheel with which the present invention is adapted to be practiced may comprise a tire rim 10 supported by a concentric wheel body or spider 11. The tire rim is preferably of the drop-center type providing a multi-flanged, channel shaped structure adapted to support a tire and tube assembly 12. For this purpose, the tire rim provides a base flange 13 having integral marginal, generally radially extending opposite side flanges 14 merging with generally axially extending respective intermediate flanges 15, with the outer extremity of the tire rim comprising generally radially outwardly extending integral terminal flanges 17. The surfaces of the several flanges within the tire-receiving channel are formed in more or less conventional manner to provide the stepped drop-center seat for engagement and retention of the tire and tube assembly 12.

The wheel body 11 may be formed in any preferred or conventional manner as a sheet metal stamping and is secured as by welding or riveting concentrically to the inner surface of the base flange 13 of the tire rim. In practice, the wheel body 11 is formed from as thin gauge sheet metal as is practicable consistent with service demands.

One of the major problems encountered in the running gear of the modern automobile adapted for high speed operation resides in maintaining a proper balance in the wheels. This problem has been particularly aggravated by the reductions in size, that is in the diameter of the wheel structure during recent years in order to accommodate larger tires such, as are popularly called balloon tires. As a result of the increasingly greater speeds of operation, with virtually inverse ratio reduction in the size of the wheels, increasingly greater detrimental reaction accrues from even relatively slight unbalancing factors that may be present in the wheel.

Heretofore, the general practice has been to counterbalance any of the unbalancing factors by applying at appropriate places upon the tire rim small weights ranging from about ½ to 4 ounces each. This creates a service problem and expense which has become an essential where the vehicle owner is concerned with avoiding premature deterioration by uneven wear and stress, especially in the tires.

According to the present invention, the need for wheel balancing service, at least with respect to the lesser range of unbalancing factors is practically eliminated, and major unbalances are readily correctable. This is accomplished by providing in the tire rim, and more particularly in the terminal flange or flanges thereof, a substantially increased mass as compared to prior constructions. The additional weight thus concentrated at the periphery of the tire rim and thereby at the periphery of the wheel structure has an effect in operation, and especially high speed operation, substantially like that of a flywheel in damping out at least the ordinary range of minor unbalancing factors. Stated another way, this concentration of mass at the outer periphery of the tire rim is such that at high speed the centrifugal force generated substantially prevents the ordinary unbalancing factors from overcoming the rotational or dynamic stability of the wheel as well as gyroscopic stability. Consequently, the wheel turns with a high degree of concentricity and freedom from radial or axial deflections or impulses which would otherwise be present and which have heretofore been counterbalanced by the laborious and expensive process of placing the wheel on a balancing machine and then applying small counterbalancing weights to the tire rim at places indicated by the machine.

Herein one or both of the terminal flanges 17 of the tire rim are substantially increased in mass, preferably uniformly and symmetrically, by forming the terminal flanges of a generally bulbous shape in cross-section so that these flanges are provided with a substantially greater amount of metal than in the conventional tire rim. The inner faces of the terminal flanges 17 retain the preferred or conventional shape while the outer sides of the flanges are symmetrically bulged or filled out as indicated generally at 18, with an increased mass of metal. Since the terminal flanges are the portions of the wheel structure having the greatest diameter and circumference, it will be appreciated that these flanges do not have to be increased to any inconvenient proportions in order to attain a very substantial increase in the mass thereof and thus very substantial flywheel counterbalancing value. If preferred, a conventional existing relatively thin metal terminal flange may be filled in with a permanent ring of weighting material secured thereto in any appropriate manner.

Merely by way of illustration and to emphasize the accomplishments of the present invention, and not by way of limitation, certain illustrations will now be given. A currently popular size tire identified as a 15 x 6.50 and its tube together weigh approximately 27½ lbs. Such a tire and tube assembly fit on a 15 x 4.50 rim which together with the wheel body or spider attains a total weight of approximately 19 lbs. It will thus be apparent that the preponderant mass of such a wheel assembly in running condition is in the tire and tube which constitute the periphery of the assembly. Inasmuch as the unbalancing factors found in the assembly are usually in or at the tire and tube portion of the assembly, it is quite clear why serious consequences result from such unbalancing factors during high speed operation. The wheel structure itself being so much lighter than the tire is forced to react to such unbalances, and generally with highly detrimental result.

By increasing the mass of the wheel structure itself at its outer periphery, and that means right where the tire is assembled with the wheel, as for example by constructing the tire rim 10 in such a manner that each of the terminal flanges or edges of the tire rim has a total mass of about 4 lbs., thus making a total increase of about 8 lbs. in the weight of the wheel structure, concentrated at its periphery, not only is the total weight of the wheel structure augmented so as to approximately equal the weight of the tire and tube assembly carried thereby, but the wheel periphery affords dynamic and gyroscopic stability during high speed rotation, much the same as a flywheel. Therefore, the usual unbalancing factors, or more accurately, the unbalancing effects of such unbalancing factors are damped out and have no consequential deleterious effect in the rotation of the wheel.

In making a wheel embodying the present invention, the standard practice can be employed, that is, the tire rim may be rolled to provide the desired cross-sectional shape, the several flanges with the exception of the terminal flange or flanges 17 being formed in the conventional relatively thin gauge while the terminal flange or flanges are thickened to afford the bulbous, increased mass structure 18 thereof. Hence, the tire rim may be of substantially uniform thin cross-sectional area with the exception of the terminal flanges 17 which due to the increased mass structure 18 thereof are of substantially increased cross-sectional area to afford the additional mass and thereby the desired peripheral weighting effect thereof.

While the counterbalancing effect of the increased and concentrated mass of the terminal flanges 17 in the tire rim will adequately compensate for any of the usual unbalancing factors within a substantial range, unbalancing factors beyond such range are adapted, by the present invention, to be readily counterbalanced by a redisposition of the counterbalancing mass of the tire rim, and more particularly the increased mass terminal flanges 17 thereof. To this end, the weighted terminal flanges 17 are adapted to be shifted transversely relative to the axis of the wheel and may assume eccentric relation relative to such axis. More particularly, when there is an unbalancing factor in the wheel assembly which requires a redistribution of weight, either or both of the tire rim terminal flanges 17 is shifted in a generally radial direction, to the extent required to effect the desired counterbalance.

As shown in perhaps considerably exaggerated form, in Figures 1 and 2, by dash outline 17a, the entire terminal flange is shifted symmetrically to an eccentric position relative to the wheel axis and with regard to a given sector of the wheel. Such shifting as stated above, is effected only to the extent necessary to perfect the counterbalance desired. In some instances, both of the tire rim terminal flanges may have to be shifted similarly, but at other times, dissimilarly or individually or at times even selectively. In any instance, whether either of the terminal flanges is to be shifted or in what direction will be determined entirely by the character of the unbalance to be overcome. It will thus be clear that any dynamic or gyroscopic unbalance of major consequence can be readily corrected.

In effecting shift of the weighted terminal flange 17, the thin character of the adjoining connecting flange 15 of the tire rim and its metallic deflectability facilitates the terminal flange shift, the connecting flange 15 bending and yielding in response to appropriate force applied to the terminal flange 17. It will be appreciated, of course, that considerable force will have to be applied to the terminal flange for effecting any particular shift thereof. Furthermore, such force must be applied while the flange is maintained in its given circularity of circumference if such circularity is to be retained.

Where side deflections or gyroscopic unbalance exists or develops in the wheel correction can be effected by shifting the appropriate weighted terminal flange or flanges 17 in the proper axial direction, substantially as indicated schematically at 17b in Fig. 2. This is accomplished by moving the selected flange 17 axially inwardly or outwardly in whole or in any part required, the metal thereof yielding sufficiently for this purpose under strong pressure and the adjoining intermediate flange 15 bending to accommodate the shift. In view of the concentration of weight in the terminal flanges only slight axial shifting of any one of the flanges wholly or in part from its normal plane will afford a substantial counterbalancing effect.

I claim as my invention:

1. A wheel structure having a tire rim portion in which at least one of the terminal flanges is throughout its circumference of substantially increased mass in cross-sectional area compared to the adjacent portion of the tire rim to the extent that in the high speed rotation of the wheels the mass thus provided in the periphery of the tire rim acts substantially in the nature of a flywheel to dampen out unbalancing factors and thus attain operating balance in the wheel, the concentrated mass of said flange being disposed eccentrically relative to the wheel axis for counterbalancing a major unbalancing factor.

2. An improved method of counterbalancing vehicle wheels, wherein the tire rim has an integral peripheral concentration of mass, which comprises shifting the concentrated mass of the rim eccentric to the wheel axis.

3. In a method of counterbalancing a vehicle wheel having a multi-flanged tire rim wherein a terminal flange of the tire rim is formed of substantially greater mass than the contiguous intermediate flange of the tire rim, which comprises uniformly bodily shifting the terminal flange throughout its circumference in a given diametric direction and relative to the remainder of the wheel, accompanied by bending of the intermediate flange to accommodate such shifting relative to the remainder of the tire rim.

4. The method of counterbalancing a vehicle wheel including a tire rim having terminal flanges, which comprises bodily shifting radially at least one of the terminal flanges relative to the remainder of the wheel while maintaining the original diameter of said one flange.

5. In a vehicle wheel including a tire rim having annular terminal flanges, each of said terminal flanges being of respective substantially uniform mass per unit area throughout its annular extent, at least one of said flanges being disposed eccentric to the axis of the wheel for counterbalancing purposes.

6. In a vehicle wheel including a tire rim having a thin gauge body portion and an annular terminal flange of increased thickness and weight substantially uniformly throughout its annular extent for counterbalancing purposes, said terminal flange being eccentrically disposed relative to the axis of the wheel.

7. In a vehicle wheel of the character described including a tire rim having a relatively thickened terminal flange and a substantially thinner intermediate flange adjoining the terminal flange, said terminal flange being eccentrically disposed relative to the axis of the wheel for counterbalancing purposes and said intermediate flange being deflectionally distorted relative to the remainder of the tire rim to accommodate the eccentricity of the terminal flange.

8. In a vehicle wheel construction including a tire rim and a body part wherein the body part is formed as a sheet metal stamping, and the tire rim comprises a circular rolled section having thin base, connecting and intermediate annular flanges and generally radially extending annular terminal flanges integral with the intermediate flanges and of substantially greater cross-sectional dimensions per unit area throughout their respective annular extent whereby to have substantial flywheel type counterbalancing function, at least one of said terminal flanges being eccentric to the axis of the wheel for major counterbalancing effect with regard to a given sector of the wheel.

9. The method of counterbalancing an existing vehicle wheel including a tire rim having a weighted terminal flange and a contiguous bendable intermediate flange, which comprises axially shifting at least a part of the terminal flange and contemporaneously and coextensively bending said intermediate flange.

GEORGE ALBERT LYON.

References Cited in the file of this patent

UNITED STATES PATENTS

| Number | Name | Date |
|---|---|---|
| 829,251 | Booraem | Aug. 21, 1906 |
| 1,695,531 | Budd | Dec. 18, 1928 |
| 1,820,857 | Wilson | Aug. 25, 1931 |
| 1,958,982 | Wintercorn | May 15, 1934 |
| 2,029,132 | Skelton | Jan. 28, 1936 |
| 2,052,295 | Hume | Aug. 25, 1936 |
| 2,057,628 | Gaenssle | Oct. 13, 1936 |
| 2,200,361 | Hunt | May 14, 1940 |
| 2,313,339 | Hare | Mar. 9, 1943 |
| 2,334,285 | Phillipi | Nov. 16, 1943 |